United States Patent
Barrows et al.

(10) Patent No.: US 11,516,196 B1
(45) Date of Patent: Nov. 29, 2022

(54) SYSTEMS AND METHODS FOR AUTHENTICATING ENTITIES

(71) Applicant: Meta Platforms, Inc., Menlo Park, CA (US)

(72) Inventors: Maximilian Francis Barrows, Seattle, WA (US); Phillip Gordon Hodgson, Seattle, WA (US); Jason George McHugh, Seattle, WA (US)

(73) Assignee: Meta Platforms, Inc., Menlo Park, CA (US)

(*) Notice: Subject to any disclaimer, the term of this patent is extended or adjusted under 35 U.S.C. 154(b) by 243 days.

(21) Appl. No.: 16/588,762

(22) Filed: Sep. 30, 2019

Related U.S. Application Data

(60) Provisional application No. 62/813,621, filed on Mar. 4, 2019.

(51) Int. Cl.
    *H04L 9/40* (2022.01)
    *G06Q 50/00* (2012.01)

(52) U.S. Cl.
    CPC ............ *H04L 63/08* (2013.01); *G06Q 50/01* (2013.01)

(58) Field of Classification Search
    None
    See application file for complete search history.

(56) References Cited

U.S. PATENT DOCUMENTS

| | | | |
|---|---|---|---|
| 10,783,518 B1* | 9/2020 | Pearce | G06Q 20/3674 |
| 10,970,385 B2* | 4/2021 | Mondello | G06F 21/44 |
| 2011/0276485 A1* | 11/2011 | Varga | G06Q 20/10 726/28 |
| 2013/0086670 A1* | 4/2013 | Vangpat | H04L 63/0815 726/8 |
| 2017/0142191 A1* | 5/2017 | Caldwell | H04L 47/82 |
| 2018/0032750 A1* | 2/2018 | Hammel | H04L 63/0853 |
| 2018/0137179 A1* | 5/2018 | Kawanabe | G06F 16/951 |

* cited by examiner

*Primary Examiner* — Kevin T Bates
*Assistant Examiner* — Emad Siddiqi
(74) *Attorney, Agent, or Firm* — Sheppard Mullin Richter & Hampton LLP

(57) ABSTRACT

Systems, methods, and non-transitory computer-readable media can obtain respective instances of verification information can be obtained from computing systems associated with a plurality of third-party vendors, wherein a computing system associated with a third-party vendor determines verification information based at least in part on an analysis of an identification document provided by a user to be authenticated. The respective instances of verification information can be interpreted, wherein interpreting an instance of verification information comprises assigning respective states to attribute fields included in the verification information. A set of interpreted instances of verification information can be evaluated in combination to determine whether to authenticate the user, wherein the set includes an interpreted instance of verification information from each of the plurality of third-party vendors.

20 Claims, 9 Drawing Sheets

SYSTEMS AND METHODS FOR AUTHENTICATING ENTITIES

CROSS REFERENCE TO RELATED APPLICATIONS

This application claims priority to U.S. Provisional Patent Application No. 62/813,621, filed on Mar. 4, 2019 and entitled "SYSTEMS AND METHODS FOR AUTHENTICATING ENTITIES".

FIELD OF THE INVENTION

The present technology relates to the field of networked communications. More particularly, the present technology relates to techniques for authenticating users in a computerized networking system.

BACKGROUND

Today, people often utilize computing devices (or systems) for a wide variety of purposes. For example, users can use their computing devices to interact with other users, create content, share content, and view content. In some cases, users can utilize their computing devices to access a social networking system and post content to the social networking system. Content posted to the social networking system may include text content items and media content items, such as audio, images, and videos. The posted content may be published to the social networking system for consumption by others.

SUMMARY

Various embodiments of the present technology can include systems, methods, and non-transitory computer readable media configured to obtain respective instances of verification information from computing systems associated with a plurality of third-party vendors, wherein a computing system associated with a third-party vendor determines verification information based at least in part on an analysis of an identification document provided by a user to be authenticated. The respective instances of verification information can be interpreted, wherein interpreting an instance of verification information comprises assigning respective states to attribute fields included in the verification information. A set of interpreted instances of verification information can be evaluated in combination to determine whether to authenticate the user, wherein the set includes an interpreted instance of verification information from each of the plurality of third-party vendors.

In an embodiment, an instance of verification information includes a first field indicating whether the identification document is authentic and a second field indicating whether an expiration date associated with the identification document has been satisfied.

In an embodiment, an instance of verification information includes a set of fields representing attributes reflected in the identification document and corresponding match information.

In an embodiment, the set of fields representing attributes include at least a name field, an address field, and a birthdate field.

In an embodiment, match information for the name field indicates whether a name appearing on the identification document matches a name of a real person, wherein match information for the address field indicates whether an address appearing on the identification document matches an address of a real person, and wherein match information for the birthdate field indicates whether a date of birth appearing on the identification document matches a birthdate of a real person.

In an embodiment, an instance of verification information indicates whether a user response to an out-of-wallet question is correct.

In an embodiment, interpreting the respective instances of verification information further includes determining whether a value for a field included in an instance of verification information satisfies one or more pre-defined authentication requirements and assigning a corresponding state to the field based at least in part on whether the value satisfies the one or more pre-defined authentication requirements.

In an embodiment, the field is assigned a "pass" state based on the one or more pre-defined authentication requirements being satisfied, wherein the field is assigned a "soft fail" state based on the one or more pre-defined authentication requirements being partially satisfied, and wherein the field is assigned a "hard fail" state based on the one or more pre-defined authentication requirements not being satisfied.

In an embodiment, evaluating the set of interpreted instances of verification information in combination further includes determining that the user is not authenticated based on any of the interpreted instances of verification information including a field that was assigned a "hard fail" state.

In an embodiment, evaluating the set of interpreted instances of verification information in combination further includes determining that the user is authenticated based on at least one of the interpreted instances of verification information in which all fields were assigned a "pass" state.

It should be appreciated that many other features, applications, embodiments, and/or variations of the disclosed technology will be apparent from the accompanying drawings and from the following detailed description. Additional and/or alternative implementations of the structures, systems, non-transitory computer readable media, and methods described herein can be employed without departing from the principles of the disclosed technology.

BRIEF DESCRIPTION OF THE DRAWINGS

The figures depict various embodiments of the disclosed technology for purposes of illustration only, wherein the figures use like reference numerals to identify like elements. One skilled in the art will readily recognize from the following discussion that alternative embodiments of the structures and methods illustrated in the figures can be employed without departing from the principles of the disclosed technology described herein.

DETAILED DESCRIPTION

Authenticating Entities

Figure 1:
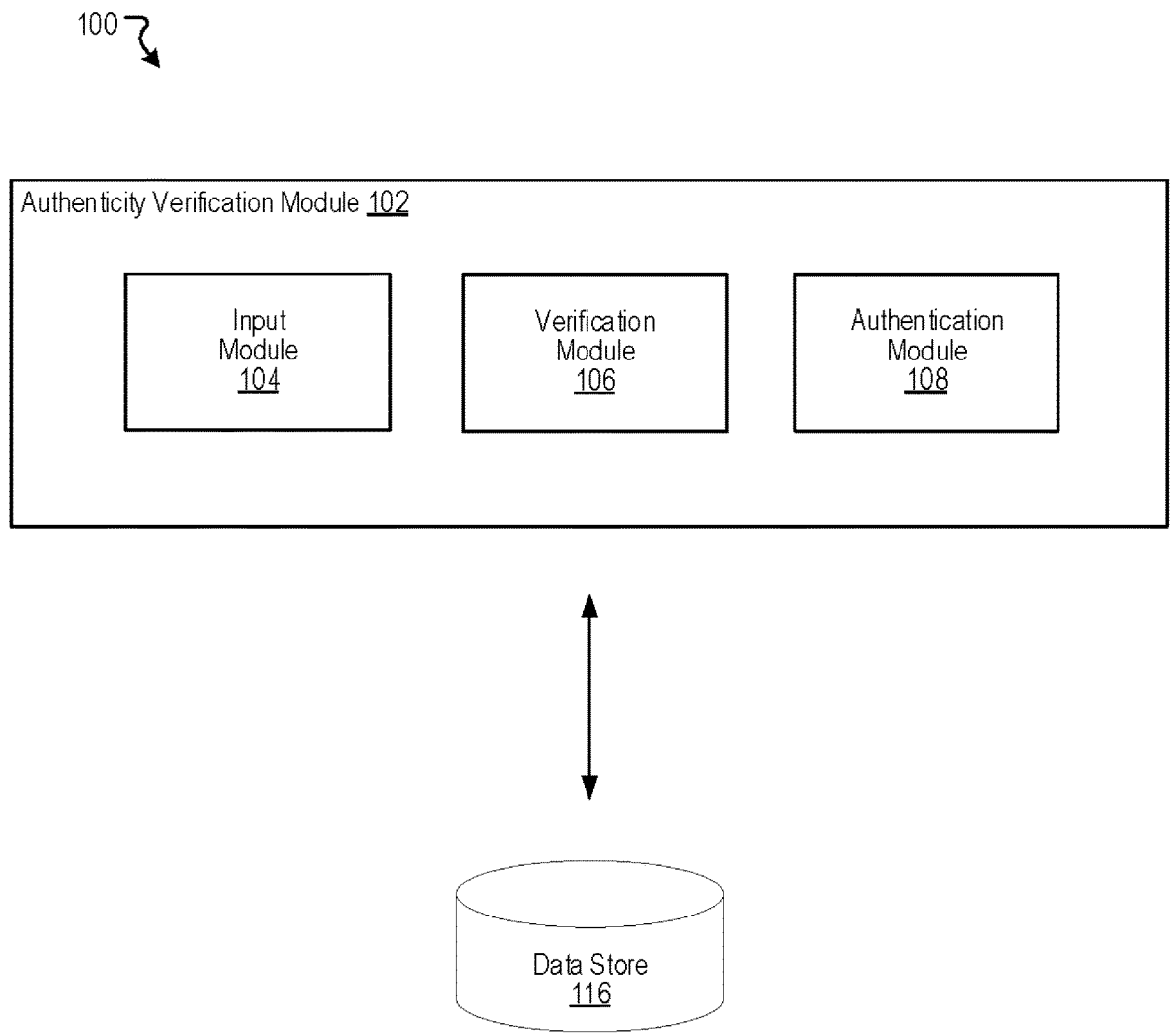
FIG. 1 illustrates an example system including an example authenticity verification module, according to an embodiment of the present technology.

Today, people often utilize computing devices (or systems) for a wide variety of purposes. For example, users can use their computing devices to interact with other users, create content, share content, and view content. In some cases, users can utilize their computing devices to access a social networking system and post content to the social networking system. Content posted to the social networking system may include text content items and media content items, such as audio, images, and videos. The posted content may be published to the social networking system for consumption by others. In some instances, users may need to be authenticated before being permitted to perform various operations through the social networking system. For example, a user may want to list an item for sale through the social networking system. In this example, the user can be authenticated to help engender confidence among users that may be hesitant to purchase the item due to lack of trust. In another example, a user may want to post content (e.g., an advertisement) for distribution through the social networking system. In this example, the user can be authenticated to help ensure that the advertisement is being posted by a real person as opposed to an automated bot or a malicious actor posing as a real person. Conventional approaches for authenticating users are generally limited to authenticating users based on login credentials or some other challenge-response mechanism. However, conventional approaches are still not able to determine whether a user being authenticated is a real person or not. Accordingly, such conventional approaches may not be effective in addressing these and other problems arising in computer technology.

An improved approach rooted in computer technology overcomes the foregoing and other disadvantages associated with conventional approaches specifically arising in the realm of computer technology. In various embodiments, users can be authenticated when performing various operations through the social networking system. In some embodiments, authenticating a user can include a first step which involves determining whether an identification document provided by the user is authentic (i.e., not forged). For example, the user can be requested to provide a digital copy of the identification document. The identification document may be a government-issued identification document, such as a driver's license or passport, for example. The digital copy of the identification document can be sent to a plurality of third-party vendors that each provide one or more responses based on an analysis of the identification document. For example, in some embodiments, each third-party vendor can provide a response including information describing an authenticity of the identification document. In such embodiments, the information provided by third-party vendors can be used to determine whether the identification document is indeed authentic. In some embodiments, authenticating the user can include a second step which involves determining whether a purported identity of the user corresponds to an identity associated with a real person. For example, in some embodiments, each third-party vendor can provide a response with information describing an identity associated with the identification document provided by the user. For example, third-party vendors can provide information indicating whether a name, address, and date of birth appearing in the identification document corresponds to a real person. The information provided by the third-party vendors can be used to determine whether the purported identity of the user, as represented by the identification document, corresponds to an identity associated with a real person. In some embodiments, authenticating the user can include a third step which involves ensuring the purported identity of the user corresponds to an identity represented by the identification document. That is, the authentication can include a determination that the user is indeed the person represented by the identification document. For example, the user can be requested to provide private information that is expected to be known only to the person represented by the identification document. As an example, the user may be requested to provide responses to one or more out-of-wallet questions. For example, the user may be asked to provide the last four digits of a government-issued identification number (e.g., a social security number, driver's license number, etc.). The responses provided by the user can be provided to the third-party vendors for confirmation. For example, the third-party vendors can provide responses indicating whether the information provided by the user is indeed associated with the person represented by the identification document. In various embodiments, responses from the different third-party vendors can be evaluated in conjunction to determine whether to authenticate the user. More details relating to the present technology are provided below.

FIG. 1 illustrates an example system 100 including an example authenticity verification module 102, according to an embodiment of the present technology. In some embodiments, the authenticity verification module 102 can be configured to authenticate users of a content provider (e.g., a social networking system such as the social networking system 630 of FIG. 6). As shown in the example of FIG. 1, the authenticity verification module 102 can include an input module 104, a verification module 106, and an authentication module 108. In some instances, the example system 100 can include at least one data store 116. The components (e.g., modules, elements, etc.) shown in this figure and all figures herein are exemplary only, and other implementations may include additional, fewer, integrated, or different components. Some components may not be shown so as not to obscure relevant details.

In some embodiments, the authenticity verification module 102 can be implemented, in part or in whole, as software, hardware, or any combination thereof. In general, a module as discussed herein can be associated with software, hardware, or any combination thereof. In some implementations, one or more functions, tasks, and/or operations of modules can be carried out or performed by software routines, software processes, hardware, and/or any combination thereof. In some cases, the authenticity verification module 102 or at least a portion thereof can be implemented using one or more computing devices or systems that include one or more servers, such as network servers or cloud servers. In some instances, the authenticity verification module 102 can, in part or in whole, be implemented within or configured to operate in conjunction with a social networking system (or service), such as the social networking system 630 of FIG. 6. In some instances, the authenticity verification module 102 can be, in part or in whole, implemented within or configured to operate in conjunction or be integrated with a client computing device, such as the user device 610 of FIG. 6. For example, the authenticity verification module 102 can be implemented as or within a dedicated application (e.g., app), a program, or an applet running on a user computing device or client computing system. The application incorporating or implementing instructions for performing some, or all, functionality of the authenticity verification module 102 can be created by a developer. The application can be provided to or maintained in a repository. In some cases, the application can be uploaded or otherwise transmitted over a network (e.g., Internet) to the repository. For example, a computing system (e.g., server) associated with or under control of the developer of the application can provide or transmit the application to the repository. The repository can include, for example, an "app" store in which the application can be maintained for access or download by a user. In response to a command by the user to download the application, the application can be provided or otherwise transmitted over a network from the repository to a computing device associated with the user. For example, a computing system (e.g., server) associated with or under control of an administrator of the repository can cause or permit the application to be transmitted to the computing device of the user so that the user can install and run the application. The developer of the application and the administrator of the repository can be different entities in some cases, but can be the same entity in other cases. It should be understood that many variations are possible.

The authenticity verification module 102 can be configured to communicate and/or operate with the at least one data store 116, as shown in the example system 100. The at least one data store 116 can be configured to store and maintain various types of data used by the authenticity verification module 102. In some embodiments, the data store 116 can store information describing users, pages, and various content (e.g., video content) associated with pages. In some implementations, the at least one data store 116 can store information associated with the social networking system (e.g., the social networking system 630 of FIG. 6). The information associated with the social networking system can include data about users, social connections, social interactions, locations, geo-fenced areas, maps, places, events, pages, groups, posts, communications, content, feeds, account settings, privacy settings, a social graph, and various other types of data. In some implementations, the at least one data store 116 can store information associated with users, such as user identifiers, user information, profile information, user specified settings, content produced or posted by users, and various other types of user data.

The input module 104 can be configured to receive digital copies of identification documents. For example, the input module 104 can provide an interface which includes options for submitting (or uploading) digital copies of identification documents. A user being authenticated can interact with the interface to provide a digital copy of an identification document. For example, the identification document may be a government-issued identification document, such as a driver's license or passport. In this example, the user can interact with the interface to submit digital copies of a front side and a back side of the identification document. In various embodiments, the digital copies can be provided to third-party vendors for verification, as described below.

The verification module 106 can be configured to provide the digital copies of the identification document to a plurality of third-party vendors for verification. In general, each third-party vendor can respond with verification information which can be determined based on an analysis of the digital copies of the identification document. For example, the verification information can indicate whether the identification document is authentic (e.g., no forgery or tampering). In another example, the verification information can indicate whether an expiration date associated with the identification document has been satisfied. In various embodiments, such verification information can be interpreted based on an operation (or use case) for which a user is being authenticated. More details regarding the verification module 106 will be provided below with reference to FIG. 2.

The authentication module 108 can be configured to authenticate a user for a given operation (or use case) based on verification information provided by the third-party vendors. For example, a computing system of each third-party vendor can provide verification information based on an analysis of the identification document provided by the user. The verification information can be interpreted by the verification module 106. The authentication module 108 can use the interpreted verification information to determine whether to authenticate the user. More details regarding the authentication module 108 will be provided below with reference to FIG. 3.

Figure 2:
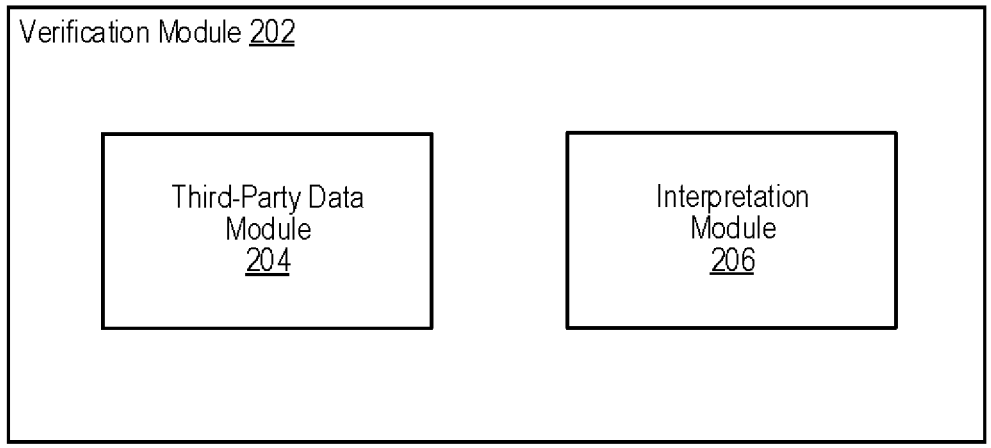
FIG. 2 illustrates an example verification module, according to an embodiment of the present technology.

FIG. 2 illustrates a verification module 202, according to an embodiment of the present technology. In some embodiments, the verification module 106 of FIG. 1 can be implemented with the verification module 202. As shown in the example of FIG. 2, the verification module 202 can include a third-party data module 204 and an interpretation module 206.

The third-party data module 204 can be configured to request verification information from a plurality of third-party vendors. For example, a user being authenticated can provide a digital copy of an identification document, such as a driver's license. The third-party data module 204 can provide the digital copy of the identification document to computing systems of a plurality of third-party vendors for analysis, for example, through one or more application programming interfaces (e.g., APIs). The computing system of each third-party vendor can respond with verification information which can be determined based on an analysis of the digital copy of the identification document. In general, computing systems of each third-party vendor can manage and store personal data for real people. The personal data can include both public and private records for individuals including names, birthdates, address histories, phone numbers, and government-issued identification numbers, to name some examples. A computing system of a third-party vendor can attempt to match information shown in the identification document against stored personal data, and provide corresponding responses. In various embodiments, other signals generated from other analysis tools can be leveraged alone or in combination with verification information provided by third-party vendors. For example, a forgery analysis tool can be applied to digital images submitted by users to determine forgery information. In another example, a viral ID detection tool can be applied to digital images to detect if multiple users are submitting the same image of an identity document for authentication. In this example, if multiple users are submitting the same image of an identity document for authentication, the viral ID detection tool can flag the image for further review. Many variations are possible.

In some embodiments, verification information provided by a computing system of a third-party vendor includes information for determining an authenticity of an identification document provided by a user being authenticated. For example, the verification information can include a field indicating whether the identification document is authentic based on forgery tests that were performed by the computing system of a third-party vendor. In another example, the verification information can include a field indicating whether an expiration date associated with the identification document has been satisfied. That is, the verification information can indicate whether the identification document is active or expired. In some embodiments, the verification information can include text data extracted from the identification document. For example, the extracted data can include a name, address, date of birth, telephone number, or email address that appears on the identification document.

In some embodiments, verification information provided by a computing system of a third-party vendor includes information for determining whether a purported identity of a user being authenticated corresponds to an identity associated with a real (or known) person. For example, the verification information can include a set of fields representing attributes (e.g., name, address, birthdate, etc.) reflected in an identification document and their corresponding match information. Such match information can be determined by the computing system based on an analysis of the identification document. In general, match information associated with a field can indicate whether a value associated with the field corresponds to a real person (e.g., "match"), whether the value does not correspond to a real person (e.g., "no match"), whether the value corresponds to outdated information associated with a real person (e.g., "old"), or whether the computing system was unable to determine a match, for example, due to its own limitations (e.g., "unknown"). For example, the verification information can include a field representing a name that appears on the identification document and corresponding match information indicating whether the name matches a name of a real person. In another example, the verification information can include a field representing an address that appears on the identification document and corresponding match information indicating whether the address matches an address of a real person. In yet another example, the verification information can include a field representing a birthdate that appears on the identification document and corresponding match information indicating whether the birthdate matches a birthdate of a real person. Many variations are possible. For example, in some embodiments, the verification information can include match information for a field indicating whether an identity associated with an identification document is alive or deceased. For example, the computing system of the third-party vendor can attempt to correlate information included in the identification document (e.g., name, birthdate, address, etc.) to a real person. The computing system can then determine whether the real person is alive or deceased based on various public and private data sources. In some embodiments, the verification information can include match information for a field indicating whether an identity associated with an identification document is associated with a government watch list. For example, the computing system of the third-party vendor can attempt to correlate information included in the identification document (e.g., name, birthdate, address, etc.) to a real person. The computing system can then determine whether the real person is appears on a government watch list based on various public and private data sources. Again, many variations are possible.

In some embodiments, verification information provided by a computing system of a third-party vendor includes information confirming that a purported identity of a user being authenticated corresponds to an identity represented by an identification document provided by the user. For example, the user can be requested to provide private information that is expected to be known only to the person represented by the identification document. As an example, the user may be requested to provide responses to one or more out-of-wallet questions. For example, the user may be asked to provide the last four digits of a government-issued identification number (e.g., a social security number, driver's license number, etc.). In such embodiments, the verification information provided by the computing system can include information confirming the accuracy of user responses to any out-of-wallet questions.

The interpretation module 206 can be configured to interpret verification information provided by a computing system of a third-party vendor. When interpreting verification information, the interpretation module 206 can assign a respective state to each field included in the verification information. In various embodiments, a field may be assigned a state of "pass", "soft fail", "hard fail", "pending", or "incapable" depending on a value associated with the field. In some embodiments, a field can be assigned a "pass" state if the field value satisfies one or more pre-defined authentication requirements. For example, verification information provided by a third-party vendor can indicate that a name that appears on an identification document matches a real person. In this example, the interpretation module 206 can assign a "pass" state to a name field in the verification information. In some embodiments, a field can be assigned a "soft fail" state if the field value partially satisfies one or more pre-defined authentication requirements. For example, verification information provided by a third-party vendor can indicate that a birthdate appearing on the identification document partially matches a birthdate of a real person. In this example, the interpretation module 206 can assign a "soft fail" state to a birthdate field in the verification information. In some embodiments, a field can be assigned a "hard fail" state if the field value partially fails one or more pre-defined authentication requirements. For example, verification information provided by a third-party vendor can indicate that the identification document is expired. In this example, the interpretation module 206 can assign a "hard fail" state to an expiration field in the verification information. In some embodiments, a field can be assigned a "pending" state if a value is still being determined for the field. In some embodiments, a field can be assigned an "incapable" state if a value cannot be determined for the field with a threshold amount of confidence or time. Many variations are possible. In some embodiments, verification information can be interpreted differently depending on an operation (or use case) for which a user is being authenticated. For example, the verification information may be subject to one set of authentication requirements when a user is being authenticated to post an item for sale through the social networking system and a different set of authentication requirements when the user is being authenticated to publish an advertisement for distribution through the social networking system. As an example, the verification information may indicate that a birthdate appearing on an identification document partially matches a birthdate associated with a real person. In this example, the partial match may be assigned a "soft fail" state if the user was being authenticated to perform an operation deemed to be permissive (e.g., post an item for sale) or a "hard fail" state if the user was being authenticated to perform an operation deemed to be restrictive (e.g., publish a political advertisement). Naturally, many variations are possible. In various embodiments, interpreted verification information from different third-party vendors can be combined to determine whether a user should or should not be authenticated for a given operation (or use case), as described below.

Figure 3:
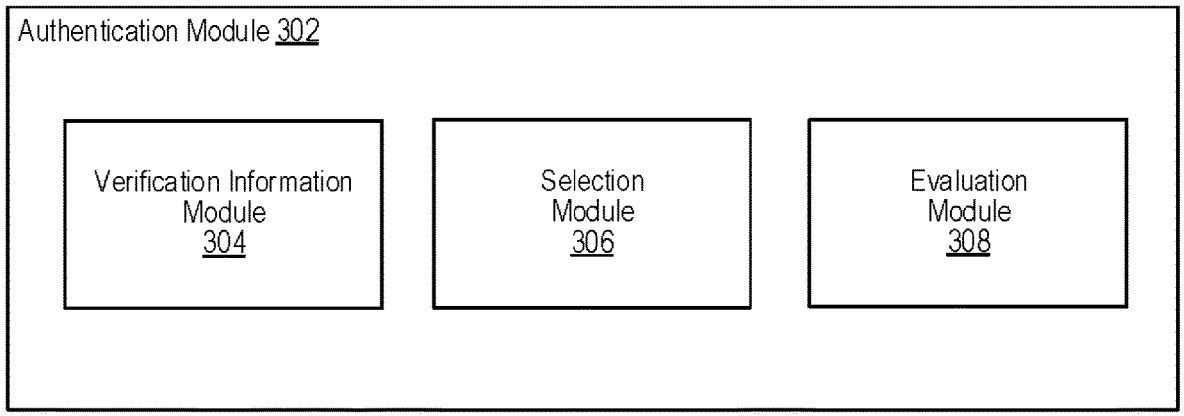
FIG. 3 illustrates an example authentication module, according to an embodiment of the present technology.

FIG. 3 illustrates an authentication module 302, according to an embodiment of the present technology. In some embodiments, the authentication module 108 of FIG. 1 can be implemented with the authentication module 302. As shown in the example of FIG. 3, the authentication module 302 can include a verification information module 304, a selection module 306, and an evaluation module 308.

The verification information module 304 can be configured to access archives of verification information provided by computing systems of third-party vendors when authenticating users. For example, the verification information module 304 can access verification information determined by third-party vendors for each authentication attempt by a given user over some period of time (e.g., month, year, etc.). Each instance of verification information can be determined by a computing system of a third-party vendor after analyzing a digital copy of an identification document provided by the user. There may be variation between the different instances of verification information for the user. For example, one instance of verification information may have been determined when the user was being authenticated for one operation (or use case) while another instance of verification information may have been determined when the user was being authenticated for another operation (or use case).

The selection module 306 can select instances of verification information to be used when determining whether to authenticate a given user. For example, the selection module 306 can select one instance of verification information for each third-party vendor based on pre-defined selection criteria. That is, if a total of three third-party vendors provided verification information for the user, then the selection module 306 can select one instance of verification information from each of the three third-party vendors. For example, in some embodiments, for each third-party vendor, the selection module 306 can select an instance of verification information that was most recently determined for the user. In some embodiments, for each third-party vendor, the selection module 306 can select an instance of verification information that was determined for the user when performing a permissive operation (e.g., posting an item for sale). In some embodiments, for each third-party vendor, the selection module 306 can select an instance of verification information that was determined for the user when performing a restrictive operation (e.g., posting a political advertisement). In some embodiments, for each third-party vendor, the selection module 306 can select a most detailed instance of verification information that was determined for the user. For example, the selection module 306 can select an instance of verification information that includes the fewest number of unknown values. Many variations are possible.

The evaluation module 308 can evaluate selected instances of verification information to authenticate the given user. In various embodiments, the instances of verification information can be evaluated in combination. In such embodiments, the instances of verification information can be evaluated based on a pre-defined framework. For example, in some embodiments, if an instance of verification information provided by a third-party vendor includes a field that was assigned a "pending" state, the evaluation module 308 can wait for the third-party vendor to respond with a value for the field. In some embodiments, if an instance of verification information includes a field that was assigned a "hard fail" state, the evaluation module 308 can determine the user is not authenticated and is therefore forbidden from performing an attempted operation. In some embodiments, if a threshold number of instances of verification information include a field that was assigned a "soft fail" state, the evaluation module 308 can determine the user is not authenticated and is therefore forbidden from performing an attempted operation. In some embodiments, if an instance of verification information includes fields that were all assigned a "pass" state, the evaluation module 308 can determine the user is authenticated and is therefore permitted to perform an attempted operation. Naturally, many variations are possible with respect to the pre-defined framework.

Figure 4A:
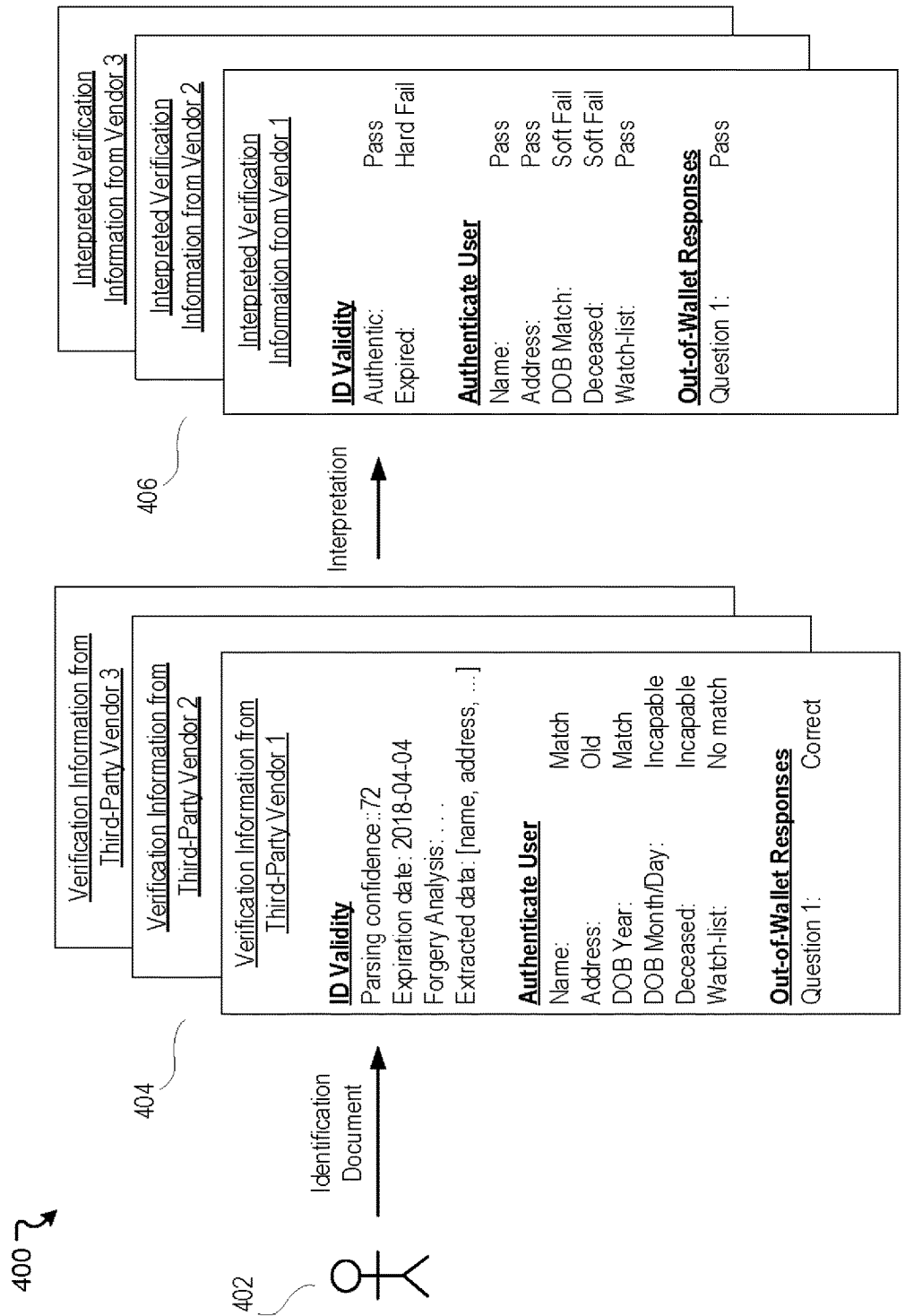
FIGS. 4A-4C illustrate example functional block diagrams, according to an embodiment of the present technology.
Figure 4B:
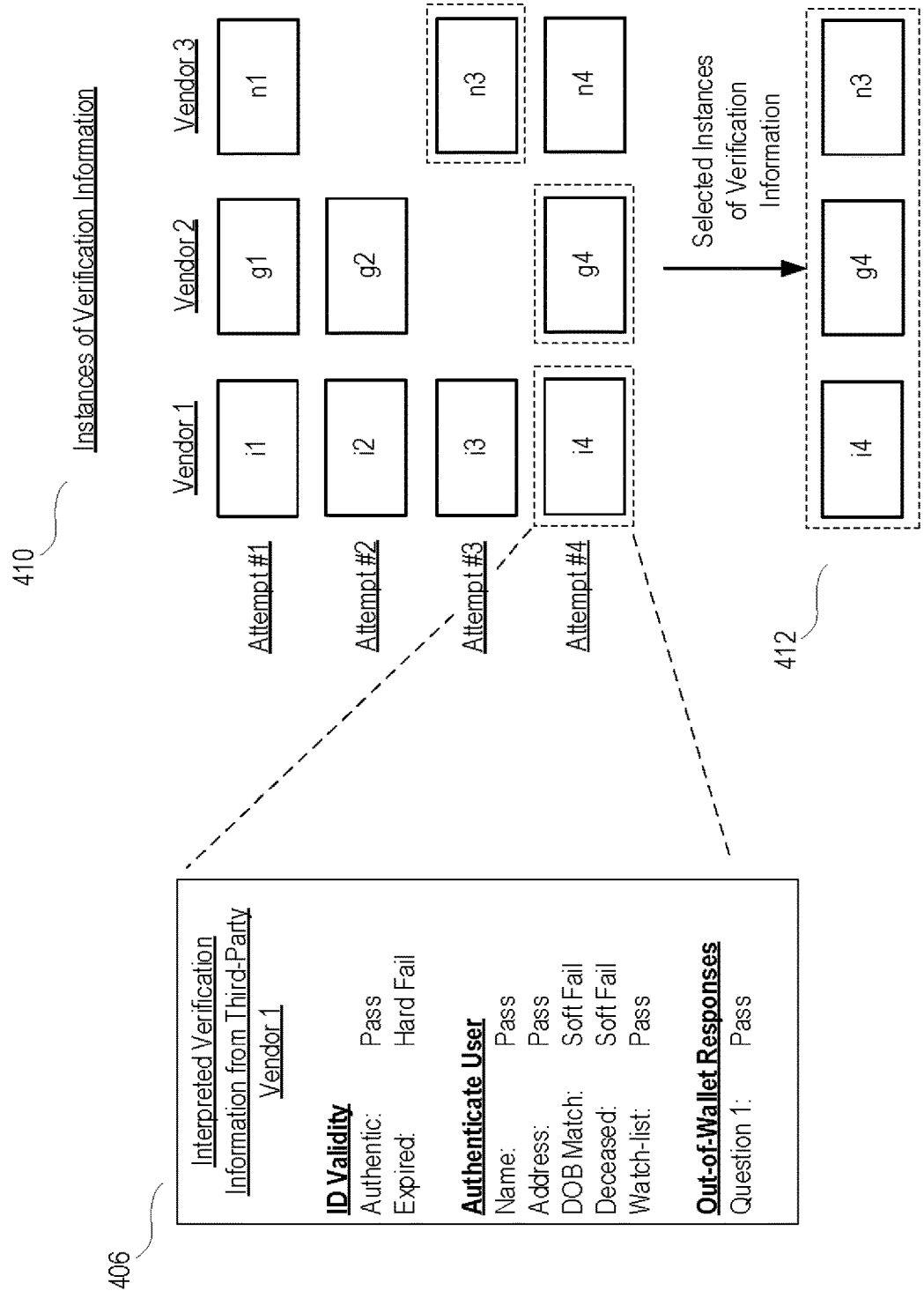
Figure 4C:
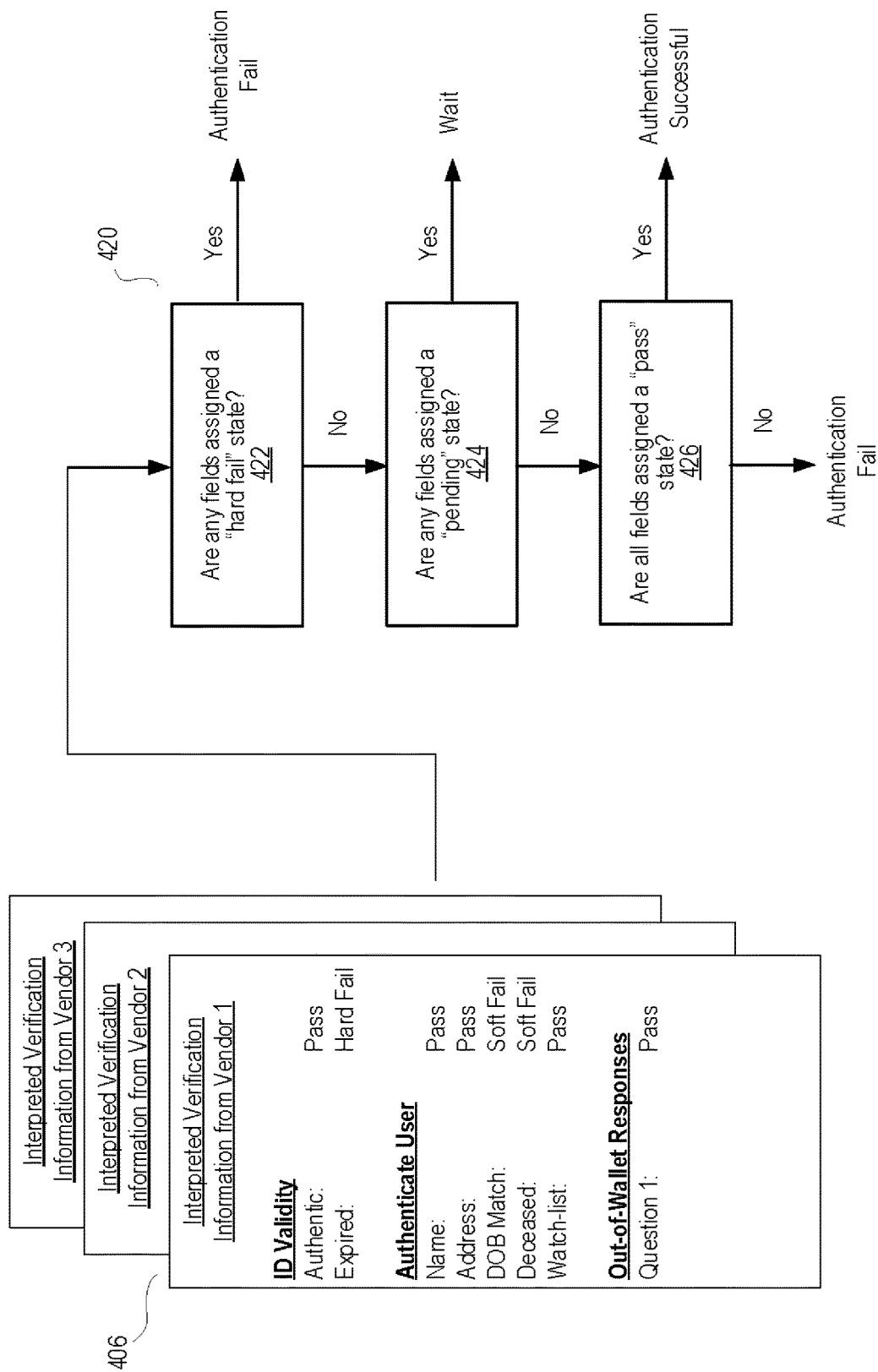

FIG. 4A illustrates an example diagram 400, according to an embodiment of the present technology. As shown in FIG. 4A, a user 402 to be authenticated can provide a digital copy of an identification document to a social networking system. The social networking system can provide the digital copy of the identification document to computing systems associated with a set of third-party vendors. The computing system of each third-party can provide verification information 404 that was determined based on an analysis of the identification document, as described above. The social networking system can interpret each instance of verification information. When interpreting verification information, the social networking system can assign a respective state to each field included in the verification information. For example, a field may be assigned a state of "pass", "soft fail", "hard fail", "pending", or "incapable" depending on a value associated with the field, as described above. The interpreted verification information 406 can be used to authenticate the user. In some embodiments, when authenticating the user, the social networking system can select one instance of verification information for each third-party vendor based on pre-defined selection criteria, as described above. For example, FIG. 4B shows instances of verification data 410 that were determined over time by different third-party vendors when authenticating the user 402. In this example, the social networking system has selected a set of instances of verification information 412 that can be used to authenticate the user 402 based on a pre-defined framework, as illustrated in the example of FIG. 4C. For example, FIG. 4C illustrates a pre-defined framework 420 for evaluating instances of interpreted verification information. In this example, at block 422, the pre-defined framework 420 can determine whether an instance of interpreted verification information from a third-party vendor includes a field that was assigned a "hard fail" state. If a field that was assigned a "hard fail" state, then authentication of the user is deemed unsuccessful. If no fields were assigned a "hard fail" state, at block 424, the pre-defined framework 420 can determine whether an instance of interpreted verification information includes a field that was assigned a "pending" state. If a field that was assigned a "pending" state, then authentication of the user is paused until a third-party vendor provides a response for the field. If no fields were assigned a "pending" state, at block 426, the pre-defined framework 420 can determine whether an instance of interpreted verification information includes all fields that was assigned a "pass" state. If all fields in an instance of interpreted verification information were assigned a "pass" state, then authentication of the user is deemed successful. Otherwise, authentication of the user is deemed unsuccessful. Again, many variations are possible.

Figure 5:
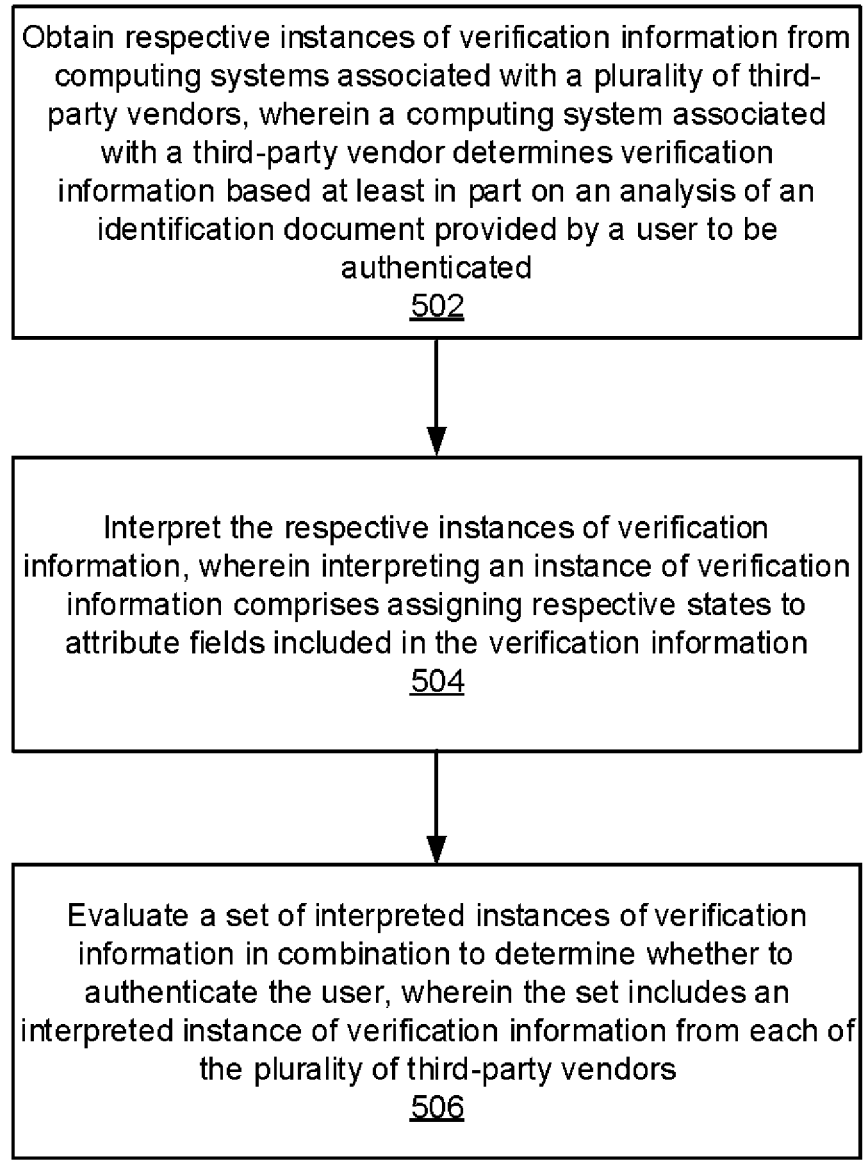
FIG. 5 illustrates an example method, according to an embodiment of the present technology.

FIG. 5 illustrates an example method 500, according to an embodiment of the present technology. It should be appreciated that there can be additional, fewer, or alternative steps performed in similar or alternative orders, or in parallel, within the scope of the various embodiments discussed herein unless otherwise stated.

At block 502, respective instances of verification information can be obtained from computing systems associated with a plurality of third-party vendors, wherein a computing system associated with a third-party vendor determines verification information based at least in part on an analysis of an identification document provided by a user to be authenticated. At block 504, the respective instances of verification information can be interpreted, wherein interpreting an instance of verification information comprises assigning respective states to attribute fields included in the verification information. At block 506, a set of interpreted instances of verification information can be evaluated in combination to determine whether to authenticate the user, wherein the set includes an interpreted instance of verification information from each of the plurality of third-party vendors.

It is contemplated that there can be many other uses, applications, and/or variations associated with the various embodiments of the present technology. For example, in some cases, user can choose whether or not to opt-in to utilize the disclosed technology. The disclosed technology can also ensure that various privacy settings and preferences are maintained and can prevent private information from being divulged. In another example, various embodiments of the present technology can learn, improve, and/or be refined over time.

Social Networking System—Example Implementation

Figure 6:
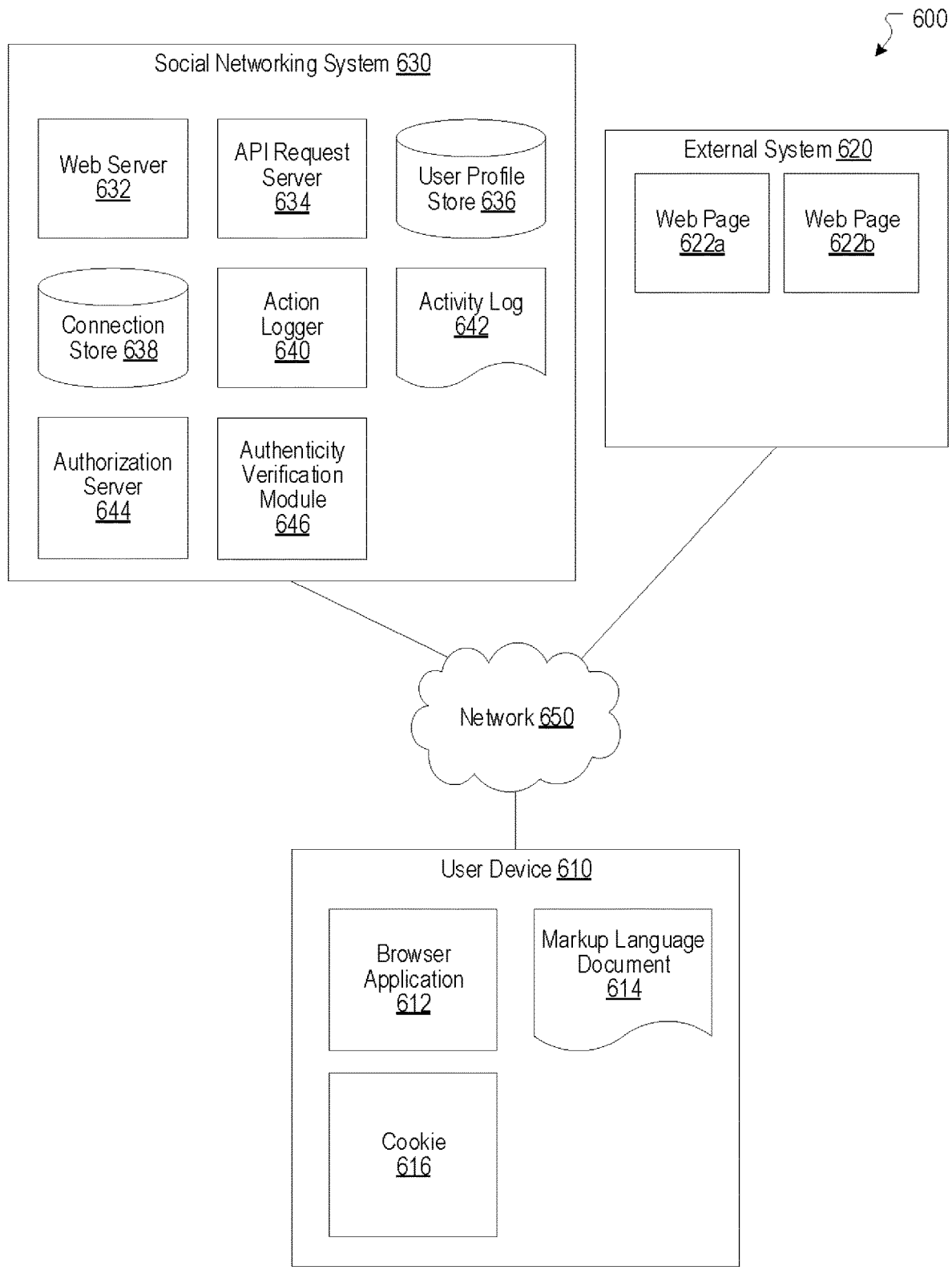
FIG. 6 illustrates a network diagram of an example system including an example social networking system that can be utilized in various scenarios, according to an embodiment of the present technology.

FIG. 6 illustrates a network diagram of an example system 600 that can be utilized in various scenarios, in accordance with an embodiment of the present technology. The system 600 includes one or more user devices 610, one or more external systems 620, a social networking system (or service) 630, and a network 650. In an embodiment, the social networking service, provider, and/or system discussed in connection with the embodiments described above may be implemented as the social networking system 630. For purposes of illustration, the embodiment of the system 600, shown by FIG. 6, includes a single external system 620 and a single user device 610. However, in other embodiments, the system 600 may include more user devices 610 and/or more external systems 620. In certain embodiments, the social networking system 630 is operated by a social network provider, whereas the external systems 620 are separate from the social networking system 630 in that they may be operated by different entities. In various embodiments, however, the social networking system 630 and the external systems 620 operate in conjunction to provide social networking services to users (or members) of the social networking system 630. In this sense, the social networking system 630 provides a platform or backbone, which other systems, such as external systems 620, may use to provide social networking services and functionalities to users across the Internet.

The user device 610 comprises one or more computing devices (or systems) that can receive input from a user and transmit and receive data via the network 650. In one embodiment, the user device 610 is a conventional computer system executing, for example, a Microsoft Windows compatible operating system (OS), Apple OS X, and/or a Linux distribution. In another embodiment, the user device 610 can be a computing device or a device having computer functionality, such as a smart-phone, a tablet, a personal digital assistant (PDA), a mobile telephone, a laptop computer, a wearable device (e.g., a pair of glasses, a watch, a bracelet, etc.), a camera, an appliance, etc. The user device 610 is configured to communicate via the network 650. The user device 610 can execute an application, for example, a browser application that allows a user of the user device 610 to interact with the social networking system 630. In another embodiment, the user device 610 interacts with the social networking system 630 through an application programming interface (API) provided by the native operating system of the user device 610, such as iOS and ANDROID. The user device 610 is configured to communicate with the external system 620 and the social networking system 630 via the network 650, which may comprise any combination of local area and/or wide area networks, using wired and/or wireless communication systems.

In one embodiment, the network 650 uses standard communications technologies and protocols. Thus, the network 650 can include links using technologies such as Ethernet, 802.11, worldwide interoperability for microwave access (WiMAX), 3G, 4G, CDMA, GSM, LTE, digital subscriber line (DSL), etc. Similarly, the networking protocols used on the network 650 can include multiprotocol label switching (MPLS), transmission control protocol/Internet protocol (TCP/IP), User Datagram Protocol (UDP), hypertext transport protocol (HTTP), simple mail transfer protocol (SMTP), file transfer protocol (FTP), and the like. The data exchanged over the network 650 can be represented using technologies and/or formats including hypertext markup language (HTML) and extensible markup language (XML). In addition, all or some links can be encrypted using conventional encryption technologies such as secure sockets layer (SSL), transport layer security (TLS), and Internet Protocol security (IPsec).

In one embodiment, the user device 610 may display content from the external system 620 and/or from the social networking system 630 by processing a markup language document 614 received from the external system 620 and from the social networking system 630 using a browser application 612. The markup language document 614 identifies content and one or more instructions describing formatting or presentation of the content. By executing the instructions included in the markup language document 614, the browser application 612 displays the identified content using the format or presentation described by the markup language document 614. For example, the markup language document 614 includes instructions for generating and displaying a web page having multiple frames that include text and/or image data retrieved from the external system 620 and the social networking system 630. In various embodiments, the markup language document 614 comprises a data file including extensible markup language (XML) data, extensible hypertext markup language (XHTML) data, or other markup language data. Additionally, the markup language document 614 may include JavaScript Object Notation (JSON) data, JSON with padding (JSONP), and JavaScript data to facilitate data-interchange between the external system 620 and the user device 610. The browser application 612 on the user device 610 may use a JavaScript compiler to decode the markup language document 614.

The markup language document 614 may also include, or link to, applications or application frameworks such as FLASH™ or Unity™ applications, the Silverlight™ application framework, etc.

In one embodiment, the user device 610 also includes one or more cookies 616 including data indicating whether a user of the user device 610 is logged into the social networking system 630, which may enable modification of the data communicated from the social networking system 630 to the user device 610.

The external system 620 includes one or more web servers that include one or more web pages 622a, 622b, which are communicated to the user device 610 using the network 650. The external system 620 is separate from the social networking system 630. For example, the external system 620 is associated with a first domain, while the social networking system 630 is associated with a separate social networking domain. Web pages 622a, 622b, included in the external system 620, comprise markup language documents 614 identifying content and including instructions specifying formatting or presentation of the identified content. As discussed previously, it should be appreciated that there can be many variations or other possibilities.

The social networking system 630 includes one or more computing devices for a social network, including a plurality of users, and providing users of the social network with the ability to communicate and interact with other users of the social network. In some instances, the social network can be represented by a graph, i.e., a data structure including edges and nodes. Other data structures can also be used to represent the social network, including but not limited to databases, objects, classes, meta elements, files, or any other data structure. The social networking system 630 may be administered, managed, or controlled by an operator. The operator of the social networking system 630 may be a human being, an automated application, or a series of applications for managing content, regulating policies, and collecting usage metrics within the social networking system 630. Any type of operator may be used.

Users may join the social networking system 630 and then add connections to any number of other users of the social networking system 630 to whom they desire to be connected. As used herein, the term "friend" refers to any other user of the social networking system 630 to whom a user has formed a connection, association, or relationship via the social networking system 630. For example, in an embodiment, if users in the social networking system 630 are represented as nodes in the social graph, the term "friend" can refer to an edge formed between and directly connecting two user nodes.

Connections may be added explicitly by a user or may be automatically created by the social networking system 630 based on common characteristics of the users (e.g., users who are alumni of the same educational institution). For example, a first user specifically selects a particular other user to be a friend. Connections in the social networking system 630 are usually in both directions, but need not be, so the terms "user" and "friend" depend on the frame of reference. Connections between users of the social networking system 630 are usually bilateral ("two-way"), or "mutual," but connections may also be unilateral, or "one-way." For example, if Bob and Joe are both users of the social networking system 630 and connected to each other, Bob and Joe are each other's connections. If, on the other hand, Bob wishes to connect to Joe to view data communicated to the social networking system 630 by Joe, but Joe does not wish to form a mutual connection, a unilateral connection may be established. The connection between users may be a direct connection; however, some embodiments of the social networking system 630 allow the connection to be indirect via one or more levels of connections or degrees of separation.

In addition to establishing and maintaining connections between users and allowing interactions between users, the social networking system 630 provides users with the ability to take actions on various types of items supported by the social networking system 630. These items may include groups or networks (i.e., social networks of people, entities, and concepts) to which users of the social networking system 630 may belong, events or calendar entries in which a user might be interested, computer-based applications that a user may use via the social networking system 630, transactions that allow users to buy or sell items via services provided by or through the social networking system 630, and interactions with advertisements that a user may perform on or off the social networking system 630. These are just a few examples of the items upon which a user may act on the social networking system 630, and many others are possible. A user may interact with anything that is capable of being represented in the social networking system 630 or in the external system 620, separate from the social networking system 630, or coupled to the social networking system 630 via the network 650.

The social networking system 630 is also capable of linking a variety of entities. For example, the social networking system 630 enables users to interact with each other as well as external systems 620 or other entities through an API, a web service, or other communication channels. The social networking system 630 generates and maintains the "social graph" comprising a plurality of nodes interconnected by a plurality of edges. Each node in the social graph may represent an entity that can act on another node and/or that can be acted on by another node. The social graph may include various types of nodes. Examples of types of nodes include users, non-person entities, content items, web pages, groups, activities, messages, concepts, and any other things that can be represented by an object in the social networking system 630. An edge between two nodes in the social graph may represent a particular kind of connection, or association, between the two nodes, which may result from node relationships or from an action that was performed by one of the nodes on the other node. In some cases, the edges between nodes can be weighted. The weight of an edge can represent an attribute associated with the edge, such as a strength of the connection or association between nodes. Different types of edges can be provided with different weights. For example, an edge created when one user "likes" another user may be given one weight, while an edge created when a user befriends another user may be given a different weight.

As an example, when a first user identifies a second user as a friend, an edge in the social graph is generated connecting a node representing the first user and a second node representing the second user. As various nodes relate or interact with each other, the social networking system 630 modifies edges connecting the various nodes to reflect the relationships and interactions.

The social networking system 630 also includes user-generated content, which enhances a user's interactions with the social networking system 630. User-generated content may include anything a user can add, upload, send, or "post" to the social networking system 630. For example, a user communicates posts to the social networking system 630 from a user device 610. Posts may include data such as status updates or other textual data, location information, images such as photos, videos, links, music or other similar data and/or media. Content may also be added to the social networking system 630 by a third party. Content "items" are represented as objects in the social networking system 630. In this way, users of the social networking system 630 are encouraged to communicate with each other by posting text and content items of various types of media through various communication channels. Such communication increases the interaction of users with each other and increases the frequency with which users interact with the social networking system 630.

The social networking system 630 includes a web server 632, an API request server 634, a user profile store 636, a connection store 638, an action logger 640, an activity log 642, and an authorization server 644. In an embodiment of the invention, the social networking system 630 may include additional, fewer, or different components for various applications. Other components, such as network interfaces, security mechanisms, load balancers, failover servers, management and network operations consoles, and the like are not shown so as to not obscure the details of the system.

The user profile store 636 maintains information about user accounts, including biographic, demographic, and other types of descriptive information, such as work experience, educational history, hobbies or preferences, location, and the like that has been declared by users or inferred by the social networking system 630. This information is stored in the user profile store 636 such that each user is uniquely identified. The social networking system 630 also stores data describing one or more connections between different users in the connection store 638. The connection information may indicate users who have similar or common work experience, group memberships, hobbies, or educational history. Additionally, the social networking system 630 includes user-defined connections between different users, allowing users to specify their relationships with other users. For example, user-defined connections allow users to generate relationships with other users that parallel the users' real-life relationships, such as friends, co-workers, partners, and so forth. Users may select from predefined types of connections, or define their own connection types as needed. Connections with other nodes in the social networking system 630, such as non-person entities, buckets, cluster centers, images, interests, pages, external systems, concepts, and the like are also stored in the connection store 638.

The social networking system 630 maintains data about objects with which a user may interact. To maintain this data, the user profile store 636 and the connection store 638 store instances of the corresponding type of objects maintained by the social networking system 630. Each object type has information fields that are suitable for storing information appropriate to the type of object. For example, the user profile store 636 contains data structures with fields suitable for describing a user's account and information related to a user's account. When a new object of a particular type is created, the social networking system 630 initializes a new data structure of the corresponding type, assigns a unique object identifier to it, and begins to add data to the object as needed. This might occur, for example, when a user becomes a user of the social networking system 630, the social networking system 630 generates a new instance of a user profile in the user profile store 636, assigns a unique identifier to the user account, and begins to populate the fields of the user account with information provided by the user.

The connection store 638 includes data structures suitable for describing a user's connections to other users, connections to external systems 620 or connections to other entities. The connection store 638 may also associate a connection type with a user's connections, which may be used in conjunction with the user's privacy setting to regulate access to information about the user. In an embodiment of the invention, the user profile store 636 and the connection store 638 may be implemented as a federated database.

Data stored in the connection store 638, the user profile store 636, and the activity log 642 enables the social networking system 630 to generate the social graph that uses nodes to identify various objects and edges connecting nodes to identify relationships between different objects. For example, if a first user establishes a connection with a second user in the social networking system 630, user accounts of the first user and the second user from the user profile store 636 may act as nodes in the social graph. The connection between the first user and the second user stored by the connection store 638 is an edge between the nodes associated with the first user and the second user. Continuing this example, the second user may then send the first user a message within the social networking system 630. The action of sending the message, which may be stored, is another edge between the two nodes in the social graph representing the first user and the second user. Additionally, the message itself may be identified and included in the social graph as another node connected to the nodes representing the first user and the second user.

In another example, a first user may tag a second user in an image that is maintained by the social networking system 630 (or, alternatively, in an image maintained by another system outside of the social networking system 630). The image may itself be represented as a node in the social networking system 630. This tagging action may create edges between the first user and the second user as well as create an edge between each of the users and the image, which is also a node in the social graph. In yet another example, if a user confirms attending an event, the user and the event are nodes obtained from the user profile store 636, where the attendance of the event is an edge between the nodes that may be retrieved from the activity log 642. By generating and maintaining the social graph, the social networking system 630 includes data describing many different types of objects and the interactions and connections among those objects, providing a rich source of socially relevant information.

The web server 632 links the social networking system 630 to one or more user devices 610 and/or one or more external systems 620 via the network 650. The web server 632 serves web pages, as well as other web-related content, such as Java, JavaScript, Flash, XML, and so forth. The web server 632 may include a mail server or other messaging functionality for receiving and routing messages between the social networking system 630 and one or more user devices 610. The messages can be instant messages, queued messages (e.g., email), text and SMS messages, or any other suitable messaging format.

The API request server 634 allows one or more external systems 620 and user devices 610 to call access information from the social networking system 630 by calling one or more API functions. The API request server 634 may also allow external systems 620 to send information to the social networking system 630 by calling APIs. The external system 620, in one embodiment, sends an API request to the social networking system 630 via the network 650, and the API request server 634 receives the API request. The API request server 634 processes the request by calling an API associated with the API request to generate an appropriate response, which the API request server 634 communicates to the external system 620 via the network 650. For example, responsive to an API request, the API request server 634 collects data associated with a user, such as the user's connections that have logged into the external system 620, and communicates the collected data to the external system 620. In another embodiment, the user device 610 communicates with the social networking system 630 via APIs in the same manner as external systems 620.

The action logger 640 is capable of receiving communications from the web server 632 about user actions on and/or off the social networking system 630. The action logger 640 populates the activity log 642 with information about user actions, enabling the social networking system 630 to discover various actions taken by its users within the social networking system 630 and outside of the social networking system 630. Any action that a particular user takes with respect to another node on the social networking system 630 may be associated with each user's account, through information maintained in the activity log 642 or in a similar database or other data repository. Examples of actions taken by a user within the social networking system 630 that are identified and stored may include, for example, adding a connection to another user, sending a message to another user, reading a message from another user, viewing content associated with another user, attending an event posted by another user, posting an image, attempting to post an image, or other actions interacting with another user or another object. When a user takes an action within the social networking system 630, the action is recorded in the activity log 642. In one embodiment, the social networking system 630 maintains the activity log 642 as a database of entries. When an action is taken within the social networking system 630, an entry for the action is added to the activity log 642. The activity log 642 may be referred to as an action log.

Additionally, user actions may be associated with concepts and actions that occur within an entity outside of the social networking system 630, such as an external system 620 that is separate from the social networking system 630. For example, the action logger 640 may receive data describing a user's interaction with an external system 620 from the web server 632. In this example, the external system 620 reports a user's interaction according to structured actions and objects in the social graph.

Other examples of actions where a user interacts with an external system 620 include a user expressing an interest in an external system 620 or another entity, a user posting a comment to the social networking system 630 that discusses an external system 620 or a web page 622*a* within the external system 620, a user posting to the social networking system 630 a Uniform Resource Locator (URL) or other identifier associated with an external system 620, a user attending an event associated with an external system 620, or any other action by a user that is related to an external system 620. Thus, the activity log 642 may include actions describing interactions between a user of the social networking system 630 and an external system 620 that is separate from the social networking system 630.

The authorization server 644 enforces one or more privacy settings of the users of the social networking system 630. A privacy setting of a user determines how particular information associated with a user can be shared. The privacy setting comprises the specification of particular information associated with a user and the specification of the entity or entities with whom the information can be shared. Examples of entities with which information can be shared may include other users, applications, external systems 620, or any entity that can potentially access the information. The information that can be shared by a user comprises user account information, such as profile photos, phone numbers associated with the user, user's connections, actions taken by the user such as adding a connection, changing user profile information, and the like.

The privacy setting specification may be provided at different levels of granularity. For example, the privacy setting may identify specific information to be shared with other users; the privacy setting identifies a work phone number or a specific set of related information, such as, personal information including profile photo, home phone number, and status. Alternatively, the privacy setting may apply to all the information associated with the user. The specification of the set of entities that can access particular information can also be specified at various levels of granularity. Various sets of entities with which information can be shared may include, for example, all friends of the user, all friends of friends, all applications, or all external systems 620. One embodiment allows the specification of the set of entities to comprise an enumeration of entities. For example, the user may provide a list of external systems 620 that are allowed to access certain information. Another embodiment allows the specification to comprise a set of entities along with exceptions that are not allowed to access the information. For example, a user may allow all external systems 620 to access the user's work information, but specify a list of external systems 620 that are not allowed to access the work information. Certain embodiments call the list of exceptions that are not allowed to access certain information a "block list". External systems 620 belonging to a block list specified by a user are blocked from accessing the information specified in the privacy setting. Various combinations of granularity of specification of information, and granularity of specification of entities, with which information is shared are possible. For example, all personal information may be shared with friends whereas all work information may be shared with friends of friends.

The authorization server 644 contains logic to determine if certain information associated with a user can be accessed by a user's friends, external systems 620, and/or other applications and entities. The external system 620 may need authorization from the authorization server 644 to access the user's more private and sensitive information, such as the user's work phone number. Based on the user's privacy settings, the authorization server 644 determines if another user, the external system 620, an application, or another entity is allowed to access information associated with the user, including information about actions taken by the user.

In some embodiments, the social networking system 630 can include a authenticity verification module 646. The authenticity verification module 646, for example, can be implemented as some or all of the functionality of the authenticity verification module 102 of FIG. 1. As discussed previously, it should be appreciated that there can be many variations or other possibilities.

Hardware Implementation

Figure 7:
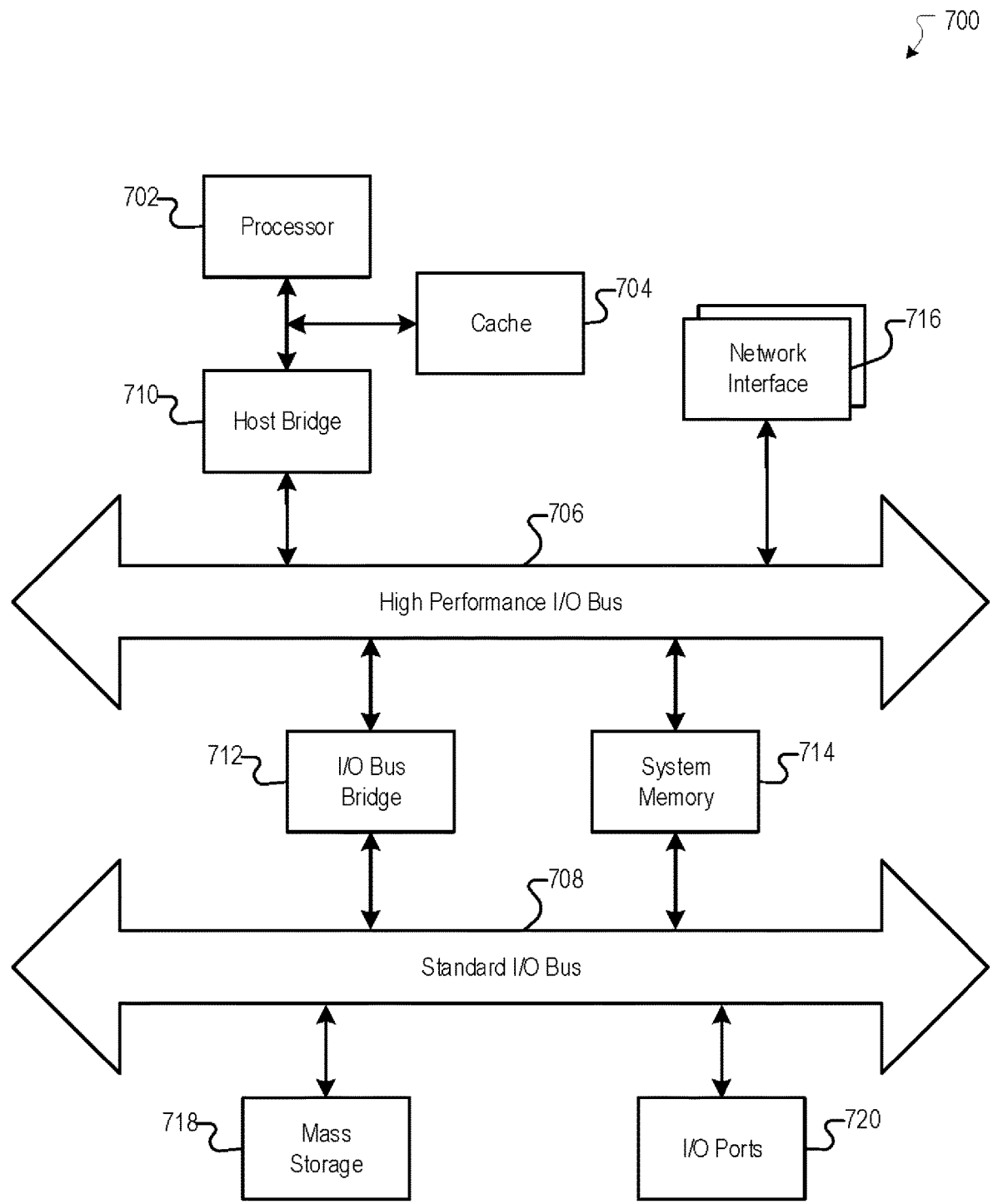
FIG. 7 illustrates an example of a computer system or computing device that can be utilized in various scenarios, according to an embodiment of the present technology.

The foregoing processes and features can be implemented by a wide variety of machine and computer system architectures and in a wide variety of network and computing environments. FIG. 7 illustrates an example of a computer system 700 that may be used to implement one or more of the embodiments described herein in accordance with an embodiment of the invention. The computer system 700 includes sets of instructions for causing the computer system 700 to perform the processes and features discussed herein. The computer system 700 may be connected (e.g., networked) to other machines. In a networked deployment, the computer system 700 may operate in the capacity of a server machine or a client machine in a client-server network environment, or as a peer machine in a peer-to-peer (or distributed) network environment. In an embodiment of the invention, the computer system 700 may be the social networking system 630, the user device 610, and the external system 720, or a component thereof. In an embodiment of the invention, the computer system 700 may be one server among many that constitutes all or part of the social networking system 630.

The computer system 700 includes a processor 702, a cache 704, and one or more executable modules and drivers, stored on a computer-readable medium, directed to the processes and features described herein. Additionally, the computer system 700 includes a high performance input/output (I/O) bus 706 and a standard I/O bus 708. A host bridge 710 couples processor 702 to high performance I/O bus 706, whereas I/O bus bridge 712 couples the two buses 706 and 708 to each other. A system memory 714 and one or more network interfaces 716 couple to high performance I/O bus 706. The computer system 700 may further include video memory and a display device coupled to the video memory (not shown). Mass storage 718 and I/O ports 720 couple to the standard I/O bus 708. The computer system 700 may optionally include a keyboard and pointing device, a display device, or other input/output devices (not shown) coupled to the standard I/O bus 708. Collectively, these elements are intended to represent a broad category of computer hardware systems, including but not limited to computer systems based on the x86-compatible processors manufactured by Intel Corporation of Santa Clara, Calif., and the x86-compatible processors manufactured by Advanced Micro Devices (AMD), Inc., of Sunnyvale, Calif., as well as any other suitable processor.

An operating system manages and controls the operation of the computer system 700, including the input and output of data to and from software applications (not shown). The operating system provides an interface between the software applications being executed on the system and the hardware components of the system. Any suitable operating system may be used, such as the LINUX Operating System, the Apple Macintosh Operating System, available from Apple Computer Inc. of Cupertino, Calif., UNIX operating systems, Microsoft® Windows® operating systems, BSD operating systems, and the like. Other implementations are possible.

The elements of the computer system 700 are described in greater detail below. In particular, the network interface 716 provides communication between the computer system 700 and any of a wide range of networks, such as an Ethernet (e.g., IEEE 802.3) network, a backplane, etc. The mass storage 718 provides permanent storage for the data and programming instructions to perform the above-described processes and features implemented by the respective computing systems identified above, whereas the system memory 714 (e.g., DRAM) provides temporary storage for the data and programming instructions when executed by the processor 702. The I/O ports 720 may be one or more serial and/or parallel communication ports that provide communication between additional peripheral devices, which may be coupled to the computer system 700.

The computer system 700 may include a variety of system architectures, and various components of the computer system 700 may be rearranged. For example, the cache 704 may be on-chip with processor 702. Alternatively, the cache 704 and the processor 702 may be packed together as a "processor module", with processor 702 being referred to as the "processor core". Furthermore, certain embodiments of the invention may neither require nor include all of the above components. For example, peripheral devices coupled to the standard I/O bus 708 may couple to the high performance I/O bus 706. In addition, in some embodiments, only a single bus may exist, with the components of the computer system 700 being coupled to the single bus. Moreover, the computer system 700 may include additional components, such as additional processors, storage devices, or memories.

In general, the processes and features described herein may be implemented as part of an operating system or a specific application, component, program, object, module, or series of instructions referred to as "programs". For example, one or more programs may be used to execute specific processes described herein. The programs typically comprise one or more instructions in various memory and storage devices in the computer system 700 that, when read and executed by one or more processors, cause the computer system 700 to perform operations to execute the processes and features described herein. The processes and features described herein may be implemented in software, firmware, hardware (e.g., an application specific integrated circuit), or any combination thereof.

In one implementation, the processes and features described herein are implemented as a series of executable modules run by the computer system 700, individually or collectively in a distributed computing environment. The foregoing modules may be realized by hardware, executable modules stored on a computer-readable medium (or machine-readable medium), or a combination of both. For example, the modules may comprise a plurality or series of instructions to be executed by a processor in a hardware system, such as the processor 702. Initially, the series of instructions may be stored on a storage device, such as the mass storage 718. However, the series of instructions can be stored on any suitable computer readable storage medium. Furthermore, the series of instructions need not be stored locally, and could be received from a remote storage device, such as a server on a network, via the network interface 716. The instructions are copied from the storage device, such as the mass storage 718, into the system memory 714 and then accessed and executed by the processor 702. In various implementations, a module or modules can be executed by a processor or multiple processors in one or multiple locations, such as multiple servers in a parallel processing environment.

Examples of computer-readable media include, but are not limited to, recordable type media such as volatile and non-volatile memory devices; solid state memories; floppy and other removable disks; hard disk drives; magnetic media; optical disks (e.g., Compact Disk Read-Only Memory (CD ROMS), Digital Versatile Disks (DVDs)); other similar non-transitory (or transitory), tangible (or non-tangible) storage medium; or any type of medium suitable for storing, encoding, or carrying a series of instructions for execution by the computer system 700 to perform any one or more of the processes and features described herein.

For purposes of explanation, numerous specific details are set forth in order to provide a thorough understanding of the description. It will be apparent, however, to one skilled in the art that embodiments of the disclosure can be practiced without these specific details. In some instances, modules, structures, processes, features, and devices are shown in block diagram form in order to avoid obscuring the description. In other instances, functional block diagrams and flow diagrams are shown to represent data and logic flows. The components of block diagrams and flow diagrams (e.g., modules, blocks, structures, devices, features, etc.) may be variously combined, separated, removed, reordered, and replaced in a manner other than as expressly described and depicted herein.

Reference in this specification to "one embodiment", "an embodiment", "other embodiments", "one series of embodiments", "some embodiments", "various embodiments", or the like means that a particular feature, design, structure, or characteristic described in connection with the embodiment is included in at least one embodiment of the disclosure. The appearances of, for example, the phrase "in one embodiment" or "in an embodiment" in various places in the specification are not necessarily all referring to the same embodiment, nor are separate or alternative embodiments mutually exclusive of other embodiments. Moreover, whether or not there is express reference to an "embodiment" or the like, various features are described, which may be variously combined and included in some embodiments, but also variously omitted in other embodiments. Similarly, various features are described that may be preferences or requirements for some embodiments, but not other embodiments.

The language used herein has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A computer-implemented method comprising:
    obtaining, by a computing system, instances of verification information from a plurality of third-party vendor systems, wherein a third-party vendor system determines verification information based at least in part on an analysis of an identification document provided by a user to be authenticated;
    determining, by the computing system, a plurality of operations for which the user is being authenticated;
    interpreting, by the computing system, the instances of verification information, wherein interpreting an instance of verification information comprises assigning respective states to attribute fields included in the verification information, wherein an evaluated field of an instance of verification information is assigned a first state based on a first operation and the evaluated field is assigned a second state based on a second operation; and
    evaluating, by the computing system, a plurality of interpreted instances of verification information in combination to determine whether to authenticate the user, wherein the plurality of interpreted instances includes an interpreted instance of verification information from each of the plurality of third-party vendor systems.

2. The computer-implemented method of claim 1, wherein an instance of verification information includes a first field indicating whether the identification document is authentic and a second field indicating whether an expiration date associated with the identification document has been satisfied.

3. The computer-implemented method of claim 1, wherein an instance of verification information includes a set of fields representing attributes reflected in the identification document and corresponding match information.

4. The computer-implemented method of claim 3, wherein the set of fields representing attributes include at least a name field, an address field, and a birthdate field.

5. The computer-implemented method of claim 4, wherein match information for the name field indicates whether a name appearing on the identification document matches a name of a real person, wherein match information for the address field indicates whether an address appearing on the identification document matches an address of a real person, and wherein match information for the birthdate field indicates whether a date of birth appearing on the identification document matches a birthdate of a real person.

6. The computer-implemented method of claim 1, wherein an instance of verification information indicates whether a user response to an out-of-wallet question is correct.

7. The computer-implemented method of claim 1, wherein interpreting the instances of verification information further comprises:
    determining, by the computing system, whether a value for a field included in an instance of verification information satisfies one or more pre-defined authentication requirements; and
    assigning, by the computing system, a corresponding state to the field based at least in part on whether the value satisfies the one or more pre-defined authentication requirements.

8. The computer-implemented method of claim 7, wherein the field is assigned a "pass" state based on the one or more pre-defined authentication requirements being satisfied, wherein the field is assigned a "soft fail" state based on the one or more pre-defined authentication requirements being partially satisfied, and wherein the field is assigned a "hard fail" state based on the one or more pre-defined authentication requirements not being satisfied.

9. The computer-implemented method of claim 1, wherein evaluating the plurality of interpreted instances of verification information in combination further comprises:
    determining, by the computing system, that the user is not authenticated based on any of the interpreted instances of verification information including a field that was assigned a "hard fail" state.

10. The computer-implemented method of claim 1, wherein evaluating the plurality of interpreted instances of verification information in combination further comprises:
    determining, by the computing system, that the user is authenticated based on at least one of the interpreted instances of verification information in which all fields were assigned a "pass" state.

11. A system comprising:
    at least one processor; and
    a memory storing instructions that, when executed by the at least one processor, cause the system to perform:
    obtaining instances of verification information from a plurality of third-party vendor systems, wherein a third-party vendor system determines verification information based at least in part on an analysis of an identification document provided by a user to be authenticated;
    determining a plurality of operations for which the user is being authenticated;
    interpreting the instances of verification information, wherein interpreting an instance of verification information comprises assigning respective states to attribute fields included in the verification information, wherein an evaluated field of an instance of verification information is assigned a first state based on a first operation and the evaluated field is assigned a second state based on a second operation; and evaluating a plurality of interpreted instances of verification information in combination to determine whether to authenticate the user, wherein the plurality of interpreted instances includes an interpreted instance of verification information from each of the plurality of third-party vendor systems.

12. The system of claim 11, wherein an instance of verification information includes a first field indicating whether the identification document is authentic and a second field indicating whether an expiration date associated with the identification document has been satisfied.

13. The system of claim 11, wherein an instance of verification information includes a set of fields representing attributes reflected in the identification document and corresponding match information.

14. The system of claim 13, wherein the set of fields representing attributes include at least a name field, an address field, and a birthdate field.

15. The system of claim 14, wherein match information for the name field indicates whether a name appearing on the identification document matches a name of a real person, wherein match information for the address field indicates whether an address appearing on the identification document matches an address of a real person, and wherein match information for the birthdate field indicates whether a date of birth appearing on the identification document matches a birthdate of a real person.

16. A non-transitory computer-readable storage medium including instructions that, when executed by at least one processor of a computing system, cause the computing system to perform a method comprising:

obtaining instances of verification information from a plurality of third-party vendor systems, wherein a third-party vendor system determines verification information based at least in part on an analysis of an identification document provided by a user to be authenticated;

determining a plurality of operations for which the user is being authenticated;

interpreting the instances of verification information, wherein interpreting an instance of verification information comprises assigning respective states to attribute fields included in the verification information, wherein an evaluated field of an instance of verification information is assigned a first state based on a first operation and the evaluated field is assigned a second state based on a second operation; and evaluating a plurality of interpreted instances of verification information in combination to determine whether to authenticate the user, wherein the plurality of interpreted instances includes an interpreted instance of verification information from each of the plurality of third-party vendor systems.

17. The non-transitory computer-readable storage medium of claim 16, wherein an instance of verification information includes a first field indicating whether the identification document is authentic and a second field indicating whether an expiration date associated with the identification document has been satisfied.

18. The non-transitory computer-readable storage medium of claim 16, wherein an instance of verification information includes a set of fields representing attributes reflected in the identification document and corresponding match information.

19. The non-transitory computer-readable storage medium of claim 18, wherein the set of fields representing attributes include at least a name field, an address field, and a birthdate field.

20. The non-transitory computer-readable storage medium of claim 19, wherein match information for the name field indicates whether a name appearing on the identification document matches a name of a real person, wherein match information for the address field indicates whether an address appearing on the identification document matches an address of a real person, and wherein match information for the birthdate field indicates whether a date of birth appearing on the identification document matches a birthdate of a real person.

\* \* \* \* \*